May 23, 1967 | J. R. MILES ETAL | 3,321,620

SOLAR SIMULATOR

Filed Aug. 5, 1963 | 3 Sheets-Sheet 1

Inventors
John R. Miles
Richard A. Kartin
James R. Gettel
Joseph N. Steiner
BY Dawson, Tilton, Fallon
Lungmus & Alexander Attys Inventors
John R. Miles
Richard A. Kartal
James R. Gellet
BY Joseph W. Steiner
Dawson, Tilton, Fallon
Lungmus & Alexander Attys Inventors
John R. Miles
Richard A. Harlan
James R. Gettel
Joseph W. Steiner
BY Dawson, Tilton, Fallon,
Lungmus & Alexander Attys 3,321,620

SOLAR SIMULATOR

John R. Miles, Glenview, Richard A. Karlin, Wilmette, and James R. Gettel, Evanston, Ill., and Joseph W. Steiner, Berea, Ohio, assignors to Linear, Inc., Chicago, Ill., a corporation Filed Aug. 5, 1963, Ser. No. 299,902

2 Claims. (Cl. 240—41.3)

This invention relates to a solar simulator, and, more particularly, to apparatus for continuously delivering high energy such as may be utilized within an environmental chamber.

Longer, more complex, and manned flights emphasize the necessity for greater understanding and assurance that equipment and subsystems will provide continuous and reliable service under aerospace operating conditions. Design and development efforts require feedback from testing in space chambers capable of simulating, over significant periods of time, the entire range of environmental conditions which will be encountered. This requirement is increased by several orders of magnitude when it becomes necessary to test whole vehicular systems in view of the questions of the compatibility of components, equipment, and systems.

Solar radiation is a critical factor in space environment. The importance of the effective simulation of this factor in aerospace research can best be appreciated only when it is realized that the work of designers has been directed not only to avoiding the possible harmful effects of solar irradiation, but also to harnessing its useful properties. Thus, operating reliability has become a dual function of the effects of solar radiation.

It is, therefore, an object of this invention to provide a solar simulator, especially adapted for the purposes outlined above.

Another object is to provide a solar simulator which is capable of providing uniformly distributed energy of the order encountered in space, i.e., from 50 to 800 watts per square foot, and which is characterized by variable intensity, reliability, simple regulation, control and monitoring.

Still another object is to provide a modular unit for a solar simulator which can be arrayed to cover various areas depending upon the specific application at the top or side of an environment simulator which is evacuated and cooled so as to simulate outer space.

Yet another object of the invention is to provide a unique power system for use in connection with a compact arc light energy source such as is advantageously employed in connection with a solar stimulator.

A further object of the invention is to provide a casing for the modular unit which can be stacked in an array to produce multiple intensities, multiple running times, or to make available replacements in case of individual lamp failures, or permit use for any combination of the foregoing purposes.

A still further object is to provide in a solar simulator apparatus characterized by one or more of the following: shielding against thermal radiation from the test object; greater flexibility in collimation; and greater uniformity of intensity and spectral distribution by overlapping of over 300 segments around a source.

Other objects and advantages of the invention may be seen in the details of construction and operation set down in this specification.

The invention is explained in conjunction with the accompanying drawings, in which—

Figures 1, 3:
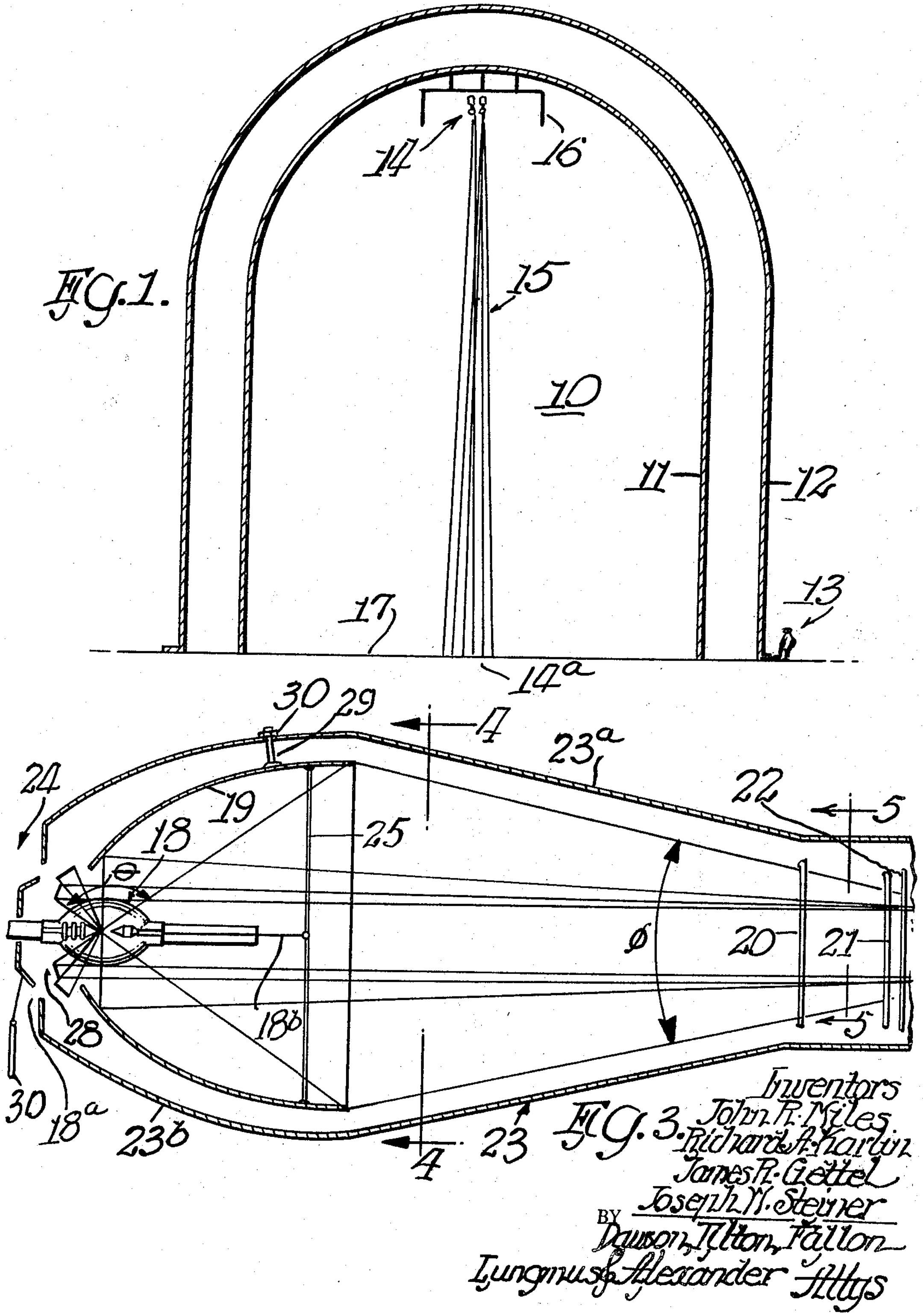
FIG. 1 is a schematic elevational view, partially in section, showing a typical solar simulator environment.
FIG. 3 is an elevational view, partially in section, of one of the modules of FIG. 1 but on considerably larger scale.
Figure 7:
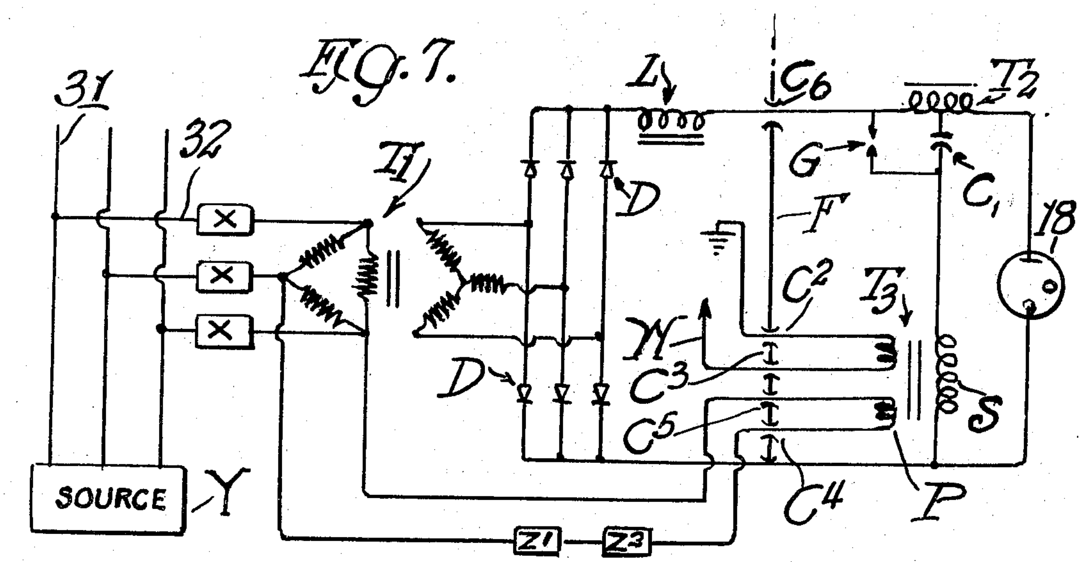
Figures 2, 4, 5, 6:
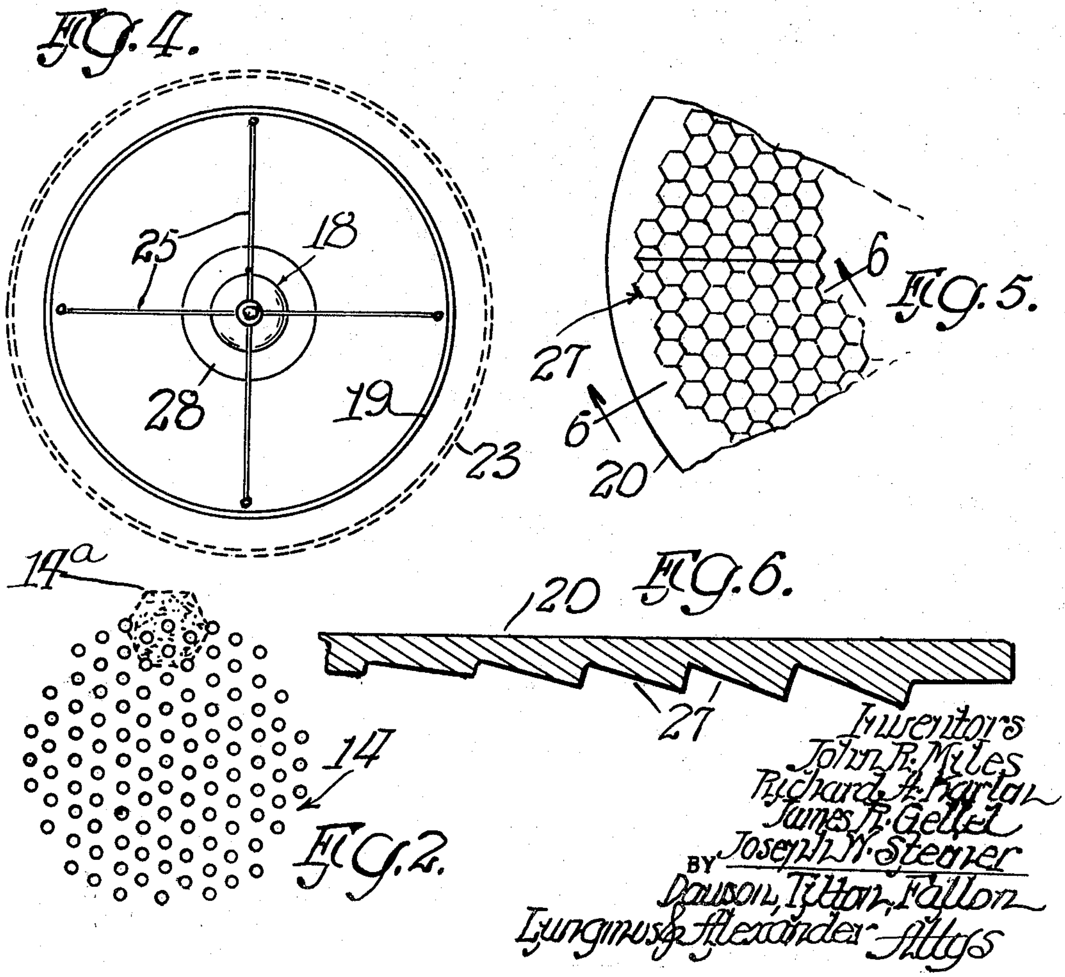
FIG. 2 is a diagram of the module pattern developed from the array of FIG. 1.
Figures 8, 9, 10:
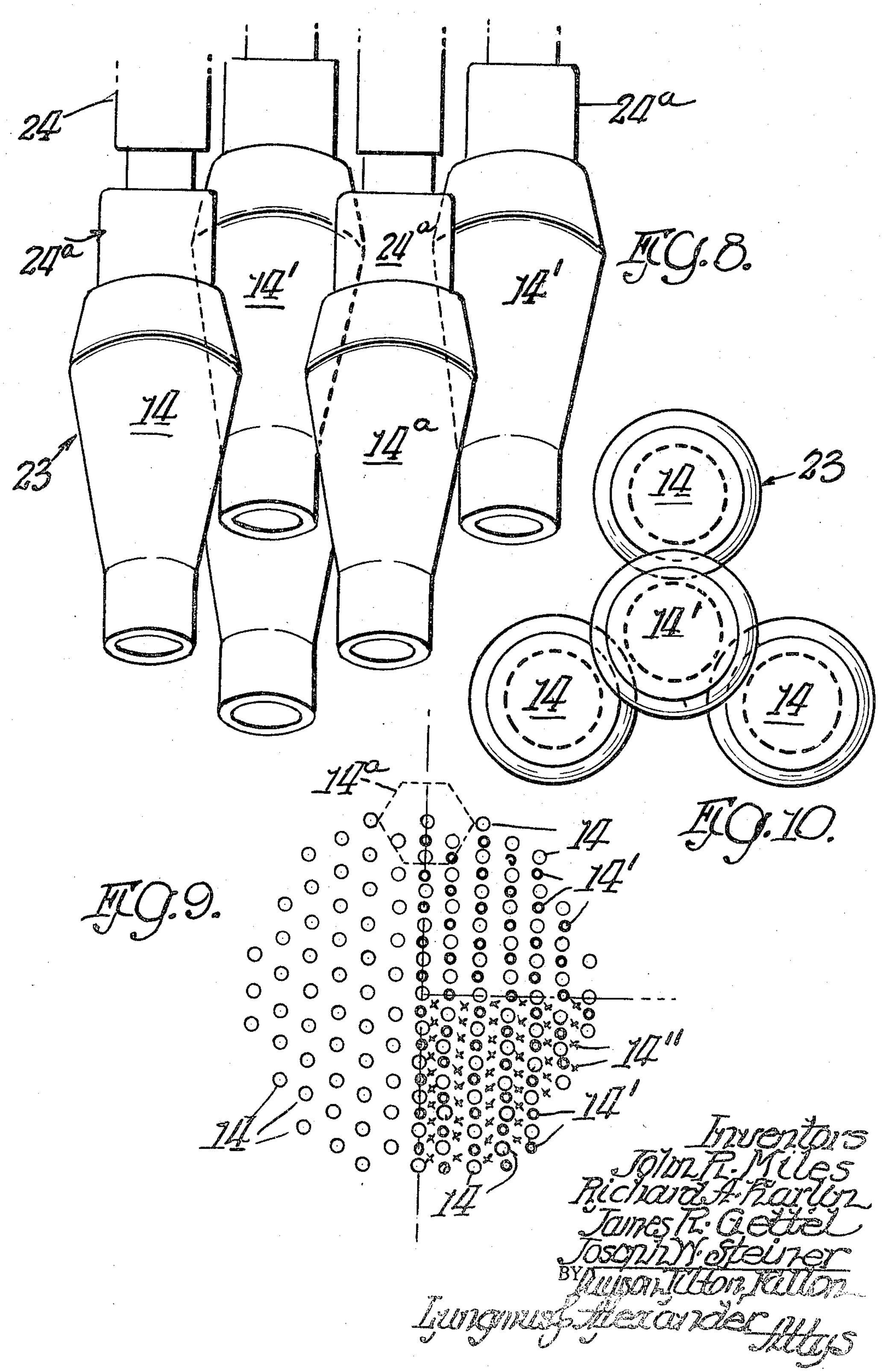

FIGS. 4, 5 and 6 are enlarged sectional views taken along the lines 4—4, 5—5 and 6—6, respectively, as applied to FIG. 3;

FIG. 7 is a schematic view of a circuit employed in connection with the module of FIG. 3;

FIG. 8 is a fragmentary perspective view of a stepped array of modules employed for developing variable intensity, facilitating replacement, etc.;

FIG. 9 is a diagram of the module pattern developable from the array of FIG. 8; and FIG. 10 is a plan view of a portion of FIG. 8

A typical environment is seen in FIG. 1, wherein the space chamber is designated 10 and is seen to be defined by an inner wall 11 and an outer wall 12. The height of the chamber may be in excess of 100 feet, as can be appreciated from a comparison of the chamber 10 relative to an operator 13. A plurality of modules 14, each capable of delivering a beam or ray 15, are supported upon a rack 16 provided at the roof of the chamber 10.

The illustrated embodiment of the invention in FIGS. 1 and 2 involves an array of 108 modules 14 on 30-inch centers, covering a test area of 500 square feet. A similar array is possible utilizing the side wall 11 as a means of support and having shorter center-to-center distances but employing a mirror for changing the direction of the radiant flux.

In FIG. 2, the 108 modules 14 are represented by dots in a generally hexagonal configuration, and the area at the floor level covered by one of the modular rays is designated 14*a*.

The array shown in FIG. 8 includes the same modules 14 but, because of the conical or tapered configuration, several layers are possible. In FIG. 9, the left-hand half of the pattern is developed by only using the lowest layer of the array. By simultaneously utilizing the secondary layer of the array, i.e., the modules 14′, a pattern such as that seen in the upper right-hand portion of FIG. 9 is developed, while if the third array is used simultaneously with the other two, the pattern in the lower right-hand quadrant is developed, the additional units being designated 14″. Thus, it is seen that the type of casing employed is advantageous in developing a more intense pattern at any given instant, or, alternatively, modules in one layer of the array can be substituted for those in another layer of the array such as might be advantageous when a bulb burns out prematurely.

In any event, the field covered on the test floor 17 is dependent on the half angle of flux collimation chosen. For example, from a point at the module lens, flux having a 2-degree half angle will form a chord of approximately 7 feet after traveling 100 feet. Thus, collimation is a critical factor in the efficiency of delivery of generated flux to a specified test area.

The self-contained module construction shown in FIG. 3 is an "on-axis" system for direct beam irradiation which does not utilize any ground optical elements and with a minimum of all optical elements. Essentially, the module consists of a flux source 18, an ellipsoidal reflector 19, lenticular lenses 20 and 21, a quartz window 22, and a casing for the above generally designated 23. Additionally, the casing 23 provides a housing 24 for the power supply circuit shown schematically in FIG. 7. Interconnecting the housing 24, which may be of the order of 4 feet long, with the casing 23, is a coupling section generally designed 24*a*. In the illustration given, the coupling section 24*a* is a three-sided prism, making it possible to connect the power supply casing either at the end, as shown, or in one of the sides if a side mounting of the casing is indicated.

The flux source 18, as shown, is a compact arc lamp and may be a 5,000 watt lamp of the xenon type, alternatively mercury xenon, such as is provided by General Electric Company under No. XE 5000. The lamps are described as "compact source" because the arc discharged takes place between closely-spaced electrodes to develop extremely high brightness over a small area, a well-balanced spectrum distribution in the visible region, and a total spectrum approximating that of solar radiation in the ultraviolet visible and infra-red bands.

The lamp 18 is supported as at 18*a* within the housing 24, and the cathode lead 18*b* is electrically coupled to the power supply housing 24 by means of a web or spider 25 supported within the reflector 19.

The reflector 19 is an ellipsoidal segment, thereby having an elliptical form which is angularly displaced, the focus or image of the arc being actually an annular ring around the major axis so that the flux will miss the end of the arc and can be more readily operated on by the lenticular lenses 20 and 21. The arc lamp 18 is placed at the proximal focus, and the ellipsoidal revolution is so generated as to develop a distal focus which is a circle about the optical axis. The optical axis is the axis of revolution used to develop the reflector. The major axis of the generating ellipse is offset from the optical axis by the order of 3 degrees so as to develop the modified ellipsoid section used as the reflector 19. Inasmuch as the lens is not at the distal focus, the circle focal pattern appears instead of an annulus 27—the lens 20 being in a plane spaced from the distal focus of the ellipsoidal section constituting the reflector 19.

The particular reflector 19 illustrated collects an unusually high proportion of the total flux; only 74 degrees at both top and bottom of the source is not received. Whether the radiometric flux distribution around the source tends to be spherical or to be biased toward the toroidal pattern of the luminous flux, a very high proportion of the total usable flux is collected.

A secondary device is employed at the back, i.e., proximal, end, of the reflector to complete flux collection. The secondary device is designated generally by the numeral 28 and may take the form of additional reflectors for displacement of images of the arc so that the arc images will by-pass the main arc onto the elliptical reflector and from there to the first lenticular lens 20. The inventive reflector collects flux over a 106 degree half angle as designated $\theta$ in FIG. 3, and the reflected rays are included within an angle $\phi$ of 11.7°. Through the use of the secondary reflectors 28, even more than 106° of the flux can be picked up. Further, since no ray of the flux needs be diverted by the lens system, particularly the refractive lenticular lens 20 more than 12°, there is minimal chromatic aberration in the inventive system.

Optimally, all of the collective reflectors shown are made in four fragments, as can be appreciated from a consideration of FIG. 4, and all can be formed by the slumping process, eliminating the need for grinding and polishing. The feature of having the reflectors in four fragments makes it possible to mount each one separately and adjust each one separately. In the illustration given, all fragments are identical and facilitate more effective application of the reflective surface. Each reflector is mounted at three points, one of which is designated 29, and adjusted by a similar number of push-pull screws 30 provided in the casing 23. The divergence of the reflector 19 from a true ellipse of revolution avoids the possibility of melting the end of the arc lamp and of melting any portion of the lenticular lenses 20 and 21. Optionally, a round, cooled shield to stop the radiation from the arc would be placed over the bulb and would not interfere with any of the flux involved in the system but which would shield the lenticular lens array from the stray radiation from the arc.

The direction of the flux to the test area covered by each module is accomplished through the pair of lenticulated lens plates 20 and 21. The first lenticular lens plate 20 is a combination prism and lens lenticular array of hexagonal elements (see FIG. 5) which serve to focus and displace the images of the arc so that they are formed in the centers of a second array of lenticular elements (in the lens plate 21) which in this case are pure lens elements, i.e., nonprismatic, inasmuch as no deflection is required. The second plate lens elements (in the lens 21) have a focal length of approximately 6″ and are placed below the first lens plate 20 by that distance. The lenticulated lens plates may both be pressed from quartz or vycor blanks. Each lenticulated plate is made up of more than 300 hexagonal segments (see FIG. 6), each of which covers the entire hexagonal pattern area of the module. Through this arrangement, an advantageous collimation of the flux is achieved, i.e., of the order of a half angle of 2°. The reduction of optical elements to one reflecting surface and six lens surfaces (including the quartz window 22) not only reduces the cost of the system initially, but greatly enhances the efficiency of the system. For example, the increase in transmission is a double-edged advantage in terms of cooling requirements, since the flux transmitted does not have to be disposed of otherwise. Thus, cooling requirements will be approximately 40% of those in a system which is half as efficient.

The use of vycor for the lenses 20 and 21 insures easy fabrication and maximum transmission of light, the index of refraction of vycor being 1.479 at a wavelength of 0.34 micron, 1.46 at a wavelength of 0.5 micron, and 1.406 at a wavelength of 3.5 microns; transmission of the material used is known to be very high in the anticipated range of transmission of 0.3–4.0 microns.

The casing 23 is made up essentially of two right-angle truncated cones, i.e., frustums, as at 23*a* and 23*b*. The conical sections are joined at their bases with the maximum module diameter accommodating, in the illustration given, a reflector having a maximum diameter of 18.8″. The casing 23 is constructed of metal, whereby outgassing is kept at a minimum and wherein welding is employed to provide full-penetration, multi-pass welds. This develops a small nosepiece for advantageous shielding and, as can be appreciated from a consideration of FIG. 8, facilitates stacking whereby the intensity may be varied at will, or, alternatively, the running time. When it is considered that approximately 2600 hours would be required as a typical trip to Venus, with the intensity increasing to above 300 watts per square foot, the reliability of a solar simulator becomes manifest. Through the illustrated arrangement, modules can be turned off and on to enhance working life, intensity, etc.

In operation, the casing 23 is vacuum-tight and is equipped with an umbilical connection as at 30 for the introduction and outlet of cooling gas and the introduction of electrical connections. Cooling of the module during operation is necessary to prevent melting or deteriorating of the source and to carry off waste thermal energy. On the other hand, while solar simulation is not under way, the module requires warming in order to aid in starting the source and to prevent condensation on the lenses. This is achieved by circulation of a gas which remains fluid at less than 100° K. Further, the interior of the casing 23 is internally pressurized to balance the internal pressure of the lamp source 18.

For the purpose of sealing the pressurized interior, the module 14 is equipped with the following seals: in the entry to the power supply 24 which constitutes the umbilical assembly for the module, a seal in the coupling section 24*a*, a seal about the quartz window 22, and a seal annularly disposed near the maximum casing diameter to facilitate replacement of the bulb. For this purpose, seals of the type employed in hydrogen bubble chambers are satisfactory, and employ double gaskets, each of which is die-cast copper, hot dipped indium. Alternatively, a plastic such as Du Pont's Viton may be used.

Each module 14 has its own power supply to provide the lamp 18 associated therewith with ignition pulses, spark voltage and arc voltage. The conditions just mentioned require a versatile power supply, as can be appreciated from the fact that pulses of a minimum of 50,000 volts are needed for reliable starting, then spark voltage several times the rated arc voltage is required in order to heat the cathode, while the voltage required to sustain the arc after the cathode becomes fully emissive is of the order of 35 volts. For this purpose, high voltage pulses are initially provided which sufficiently ionize the gas in the lamp 18 to develop a spark condition. Thereafter, when the lamp has been sufficiently heated by the spark phase, it begins its transition to the arc phase, which ultimately becomes the steady state condition. This transition may require several minutes of operation.

The significantly different demands of these conditions are met by the inventive power supply circuit, one of which is provided for each lamp, thereby substantially eliminating the need for resistive ballast required to allow one lamp to spark with another already in the arc condition. Further, the use of a given circuit for each module eliminates the large voltage drops which would necessarily be present in the required high current distribution lines, it eliminates the difficulty in meeting diode requirements, and it avoids the possibility of multiple lamp failure resulting from one supply failure.

Advantageously, the power supply for each module is an integral part of the module package. Packed integrally with the lamp, the power supply benefits from the environmental control for the lamp. Also the high current leads can be short, and radiation of electromagnetic interference is minimized.

Many power supplies may be energized from a single source (so designated in FIG. 7) through transmission lines 31. In the illustration given, multi-phase current is employed, which may advantageously be three-phase for ease in obtaining components. A typical current is at a potential of 600 volts and a frequency of 800 cycles per second. Depending upon the installation, these parameters may be varied, although desirably the frequency is equal to or in excess of 400 cycles per second. The transmission lines 31 are connected in parallel to the various modules, and in each case there are provided branch lines 32 leading to a multi-phase, step-down transformer $T_1$. Interposed in the lines 32 and between the lines 31 and the transformer $T_1$ so that there is provided one element for each phase, are a plurality of reactors X. One reactor is placed in series with each phase of the line, so that in the illustration given three reactors X are provided. A number of advantages accrue from the use of the reactors X which serve as ballasts. Importantly, in combination with the other supply elements, they cause the supply to automatically perform the spark-arc transition without the use of electromechanical components. Further, the reactors protect the main power line in case of failure of any other power supply component, or in the case of lamp failure, including lamp short circuit. Still further, the reactors serve to stabilize the lamp input power under change in lamp characteristics or from one lamp to another. Further yet, the reactors cause lamp output flux to be a predictable, stable, and fairly linear function of the source voltage.

The output from the secondary of the transformer $T_1$ is rectified by means of six rectifiers D, and the rectified voltage is applied to the compact arc lamp 18 through an inductor L and a pulse transformer $T_2$.

Initially, the lamp 18 is off, and this causes most of the line voltage to appear across the transformer $T_1$, the spark gap G and the capacitor $C_1$ being sized to appear as an open circuit to 800 cycles per second current. The voltage across one section of the transformer $T_1$ is applied to the primary P of a step-up transformer $T_3$ through an impedance $Z_1$. Optionally, a second impedance element $Z_2$ may be provided, either in series, as shown, or in parallel with the first-mentioned element $Z_1$. The element $Z_1$ may take the form of an inductor, a saturating inductor, a capacitor, or any of the above in combination with the second element $Z_2$, which may be a capacitor, an inductor, a resistor, a voltage dependent resistor, an avalanche diode, or the like. The function of the element $Z_1$, or, alternatively, the combination of $Z_1$ and $Z_2$, is to provide a rapid increase of voltage thereacross as current increases until a threshold is reached, after which voltage rises more slowly as current increases. The threshold is chosen so that when a voltage across the main transformer $T_1$ is high enough, sufficient voltage appears across the step-up transformer primary P to create sufficient voltage across the secondary winding S of $T_3$ to break down the spark gap G connected to the primary of the pulse transformer $T_2$ through the capacitor $C_1$. When this happens, the resulting sparks excite the pulse transformer $T_2$ and the pulse transformer $T_2$ applies output high voltage, high frequency ignition pulses to the gaseous lamp 18.

When the high voltage pulses have sufficiently ionized the gas in the lamp 18, the lamp 18 will develop a spark condition and the input reactors X cause the supply impedance to be such that proper voltage is applied to the lamp 18 to maintain the spark phase. Thereafter, and when the lamp has been sufficiently heated by the spark phase, it begins its transition to the arc phase. The reactors X at this time cause the supply impedance to be proper for establishing relatively constant power of proper magnitude for the arc phase.

When the lamp reaches the arc phase, the voltage across the main transformer $T_1$ decreases. This decreases the voltage across the primary P of the step-up transformer $T_3$, an effect which is enhanced when the element $Z_1$ (alternatively, the combination $Z_1$ and $Z_2$) is nonlinear. As a result, the step-up transformer $T_3$ can no longer break down the spark gap, and the high voltage ignition pulses cease. Should the lamp arc quench, the ignition pulses automatically resume, so that as long as input voltage is present but the arc is not on, the ignition circuit operates.

The lamp state can be monitored by means of the voltage across the primary of transformer $T_1$ or the voltage across a reactor X. In the example given, a third winding W on the step-up transformer $T_3$ supplies the monitor signal. If this winding is shorted, the transformer voltage collapses and ignition ceases. The element $Z_1$ (or, alternatively, the combination $Z_1$ and $Z_2$) limits the current into $T_3$ when W is shorted. Thus ignition can be controlled from the monitor wire. The monitor wire carries lamp state information to an array monitor panel (not shown) and in a large array, the convenience of a single wire to each module for monitoring and controlling the same is considerable. A single wire monitor is achieved through coupling the other wire of winding W to ground or any phase of the source. For the sake of convenience, the illustration in FIG. 7 shows this portion of the winding grounded.

Radio frequency shielding as at F and by-pass capacitors as at $C_2$–$C_6$ are employed to contain interference, particularly that produced by the ignition circuit. $C_6$ also completes the circuit for the high frequency pulses created by the pulse transformer. The by-pass capacitors $C_2$ through $C_6$ are high frequency feedthrough types mounted on a metal bulkhead which provides radio frequency shielding. Further, a ripple filter L may be employed, although due to the use of full wave rectified, multi-phase current, the ripple current may be tolerated. In any event, because the ripple current has a frequency of 4800 cycles per second, as illustrated, it will yield to a very small inductance. The high frequency of the ripple, yielding as it does to a very small value of inductance, means also that a small-sized inductance can be employed, which is advantageous in a multi-component array where space is at a premium. Also by virtue of providing a base frequency of substantial magnitude, i.e., 800 cycles per second, there is provided a substantial reduction in the size and weight of the reactors and transformers which is especially significant when considering the large array of modules. Further, the source voltage is relatively high to minimize copper loss in the distribution system, such loss creating an imbalance between lamps at different distances, lamp power changes due to the temperature coefficient of resistance of copper, and unnecessary waste heat.

As pointed out previously, an important advantage of the inventive circuit lies in the use of heavy ballast to automatically provide proper voltage for all phases of lamp operation without the use of mechanical devices such as relays and without the use of storage capacitors.

A typical set of parameters for the operative elements in the FIG. 7 circuit are as follows, based upon circuit values of a source voltage of 600 volts, a source frequency of 800 cycles per second, and a lamp input capacity of 5,000 watts for steady state operation:

| Element designation: | Parameter |
|---|---|
| X | 15 millihenries. |
| L | 30 microhenries. |
| $T_2$ | About 5 to 1 step-up pulse transformer. |
| $T_3$ | 200 volts on primary produces 10,000 volts on secondary and 28 volts on winding W. |
| $Z_1$ | 1 henry inductor saturating to 0.2 henry at 300 volts. |
| $Z_2$ | 100 millihenries inductor. |
| $C_1$ | 500 picofarads. |
| $C_2$ | 0.1 microfarad. |
| $C_3$ | 0.1 microfarad. |
| $C_4$ | 0.1 microfarad. |
| $C_5$ | 0.01 microfarad. |
| $C_6$ | 0.1 microfarad. |
| G | Gap to break at about 10,000 volts. |

In operation, multi-phase power is delivered to each module circuit to ignite the associated compact arc gaseous tube 18. The designation Y on the source indicates a control to vary the voltage. The lamp input power is approximately a linear function of the source voltage so that control of the lamp 18 input power is readily achieved through the inventive circuit. The rays from the lamp, after it reaches the steady state arcing condition, are reflected from both the primary and secondary reflectors, each of which is constructed of fragments joined along meridians. A variety of shapes may be used for the secondary reflector, such as spherical or elliptical segments. The flux emanating from the reflector arrangement is directed toward the first lens, which serves to refract and bring each bundle of rays into parallelism with the optical axis focussing the output of each hexagonal lenticular lens on a corresponding hexagonal lenticular lens in the power lens plate 21. The output of the lens plate 21 passes through the quartz lens, i.e., sealing lens, toward the floor of the chamber 10, whereby solar emission is emulated.

We find advantageous the use of a casing 23 which is tapered in proceeding to the two ends thereof so as to facilitate stack mounting, and in this connection the ellipsoidal section employed as the reflector makes possible modules of lesser diameter. Thus, the sacrifice in efficiency over a parabolic reflector is more than compensated for by the greater number of modules that can be placed in a given area. Also, the power supply is arranged in the form of a relatively small diameter tubular casing as at 24, thereby cooperating with the shape of the casing 23 in developing a relatively packed array. The use of higher frequencies and voltages in the power supply accentuates this advantage since smaller components can be used with the same effect as larger components in the case of lower frequencies and voltages, yielding the same ballasting effect. Alternatively, maintaining the size of elements corresponding to a lower frequency would, in the system illustrated, yield more ballasting. The ballasting is advantageous in aiding the lamp regulation—the operation of the lamp changing due to the change of lamp characteristics through age, the switching of lamps, variation in source voltage, etc. Further, the employment of a higher frequency means that the period between the high frequency ignition pulses is shorter. In the illustration given, there are provided 1600 pulses, each pulse containing waves of the order of 20 megacycles.

Further, in the inventive circuit, voltage in the form of alternating current, as from the primary of the step-down transformer $T_1$, is applied directly to the step-up transformer $T_3$ and without any intervening active elements which are subject to deterioration. Conventionally, power supplies of the general type illustrated here use active elements such as semi-conductors which have a limited environmental range, increasing the possibility of mis-operation at a time when replacement is impossible. This possibility is avoided by directing ballasted unrectified alternating current to the pulse transformer for the purpose of exciting the resonant circuit made up of condenser $C_1$ and the auto transformer $T_2$. The effectiveness of this circuit is enhanced through the use of a nonlinear element such as $Z_1$ capable of providing a "threshold" in the voltage-current relationship—the nonlinear element being an "inactive" element which is not sensitive to environmental extremes such as the extremes of temperature encountered in space research. Still further, the subcircuit is advantageously used to monitor and control through the use of a single wire and without the need of electromechanical components. For this purpose, the impedance may be linear or nonlinear, serving to limit the current that flows to the transformer $T_3$, the impedance for this purpose serving to in effect isolate the step-up transformer $T_3$.

While in the foregoing specification a detailed description of an embodiment of the invention has been set down for the purpose of explanation thereof, many variations in the details herein given may be made by those skilled in the art without departing from the spirit and scope of the invention.

We claim:

1. In a solar simulator, a light source, a reflector including a generally ellipsoidal section positioned about said source with said source being located at the section proximal focus and extending through said reflector, a supplemental arcuate reflector about said source exterior to said section, both said section and arcuate reflector being arranged to develop an annular pattern in a plane adjacent to but spaced short of the distal focus of said section, a prismatic lenticular lens at said plane, and a second lenticular lens at the focus of said prismatic lenticular lens for collimating light rays from said prismatic lenticular lens.

2. The structure of claim 1 in which said light source includes a xenon-type gaseous arc lamp.

(References on following page)

References Cited by the Examiner

UNITED STATES PATENTS

| | | | |
|---|---|---|---|
| 1,800,211 | 4/1931 | De Vault | 88—24 X |
| 1,818,875 | 8/1931 | Wardwell | 88—24 X |
| 2,064,253 | 12/1936 | Fortney | 240—41.3 |
| 2,293,014 | 8/1942 | Clarkson | 240—41.3 |
| 2,311,734 | 2/1943 | Clarkson | 240—41.3 |
| 2,683,798 | 7/1954 | Craig | 240—51.11 |
| 2,991,691 | 7/1961 | Schering | 352—198 |
| 2,998,548 | 8/1961 | Girard | 315—205 |
| 3,028,483 | 4/1962 | Simmon | 240—41.35 |
| 3,037,147 | 5/1962 | Genuit et al. | 315—205 |
| 3,127,112 | 3/1964 | McCammon et al. | 240—11.4 |
| 3,132,812 | 5/1964 | Strobel | 240—41.35 |

FOREIGN PATENTS

| | | |
|---|---|---|
| 309,908 | 6/1930 | Great Britain. |
| 460,122 | 1/1937 | Great Britain. |
| 818,229 | 8/1959 | Great Britain. |

NORTON ANSHER, *Primary Examiner.*

C. C. LOGAN, *Assistant Examiner.*